Sept. 28, 1937.   K. O. BOTNEN   2,093,996
INTERNAL EXPANSION BRAKE
Filed March 25, 1937
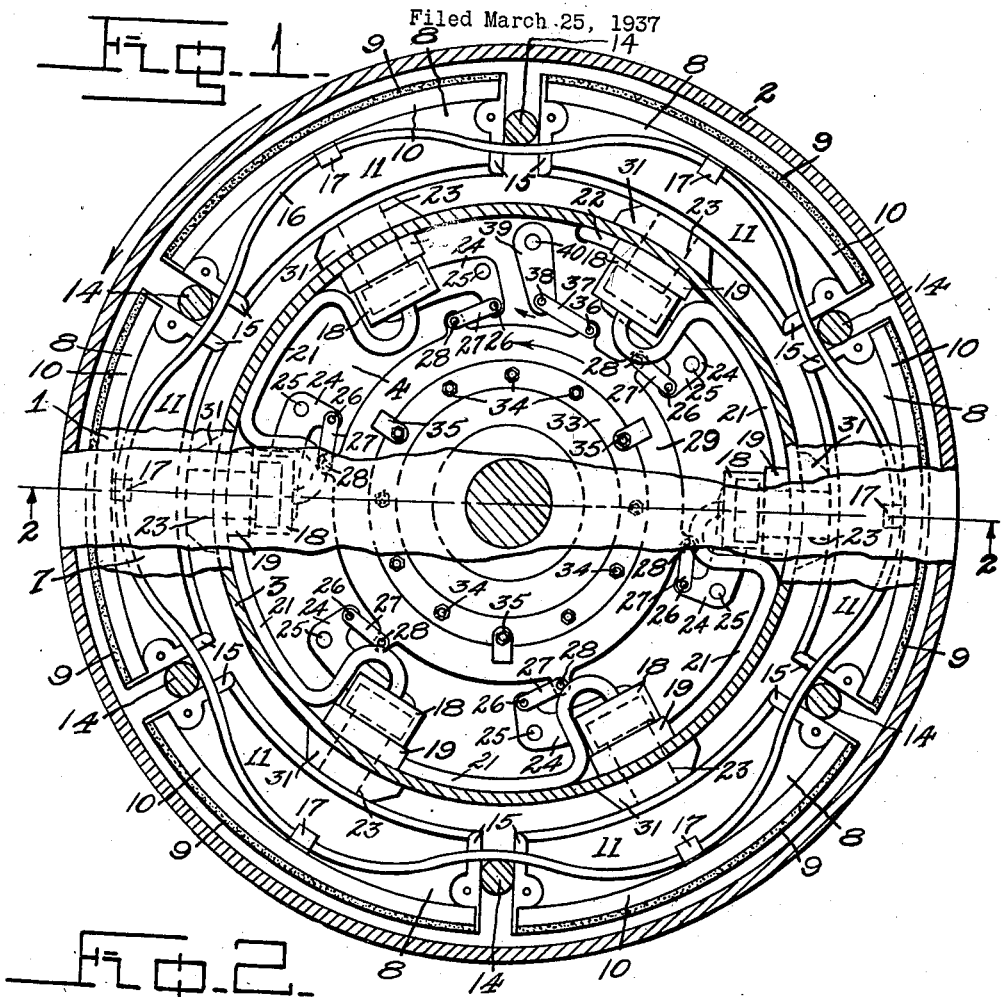
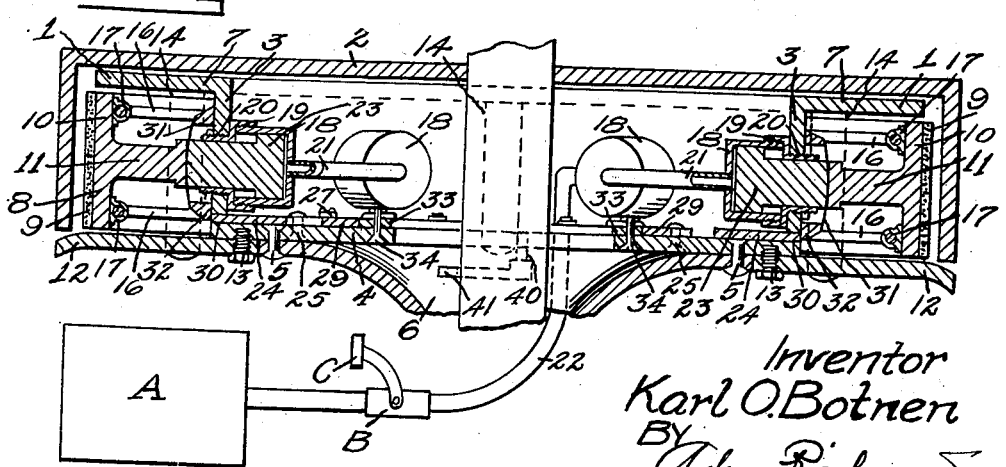
Inventor
Karl O. Botnen
By
Adams Richmond
Attorney Patented Sept. 28, 1937

2,093,996

UNITED STATES PATENT OFFICE 2,093,996

INTERNAL EXPANSION BRAKE

Karl O. Botnen, Schofield Barracks, Territory of Hawaii

Application March 25, 1937, Serial No. 133,034

7 Claims. (Cl. 188—106)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to improvements in brakes and has particular application to brakes of that type known as internal expanding band brakes.

One of the objects of the invention is to provide a brake of the expanding shoe type with two independently operable applying means so that one can always be operated for expanding the shoes even if the other one fails.

Another object of the invention is to provide an improved brake of the internal expanding shoe type which shoes may be operated either by fluid pressure or mechanically or both, to engage the brake drum with which they are associated.

Still another object of the invention is to provide an internal expanding brake for vehicles including means for permitting the expanding members of the brake to be removed for relining or adjusting the same without the necessity of removing the wheels from the vehicle.

Briefly stated, the invention comprises a brake of the expansion type having two independently operable applying means provided thereon for actuating the expansion members of the brake including fluid pressure means operated by the usual foot pedal and mechanical linkage means pivotally connected to a slip ring and operated through the emergency brake lever or an auxiliary foot pedal. The said fluid pressure means has a part which directly contacts the expansion members of the brake and the said mechanical means contacts the expansion members indirectly through pressure plates so that the operation of the expansion members by either of the applying means does not affect the operation of the other applying means.

With the above and other objects and advantages in view the invention specifically consists in features of construction, arrangement and operation of parts which will hereinafter appear.

For purposes of illustration the invention will be described and claimed with reference to the accompanying drawing, in which like members distinguish like parts and in which:—

Fig. 1 is a sectional side view, partly in elevation of the brake embodying the invention, and Fig. 2 is a cross-sectional view taken on line 2—2 of Fig. 1.

In my annexed drawing a supporting member is indicated at (1) and a brake drum is indicated at (2), which is adapted to be mounted on the wheels (not shown) of a vehicle and rotatable therewith. The supporting member (1) is mounted within the drum (2) and comprises an inwardly extending annular flange (3) having a flange (4) on its lower end which is fixed by rivets (5) or the like to the non-rotating part of the vehicle such as the rear axle housing (6) thereof. At the inner end of the flange (3) an annular flange (7) is provided for a purpose which will hereinafter be described.

A plurality of arcuate brake-shoes (8) having a curvature conforming to the inner surface of the brake drum (2), with brake linings (9) secured thereto, are symmetrically disposed around the drum in close proximity to the inner surface thereof; more specifically the brake-shoes (8) are T-shaped in cross-section having a web (10) and a flange portion (11). The inner arcuate surface of the flange portion (11) is enlarged and conforms to the outer surface of the flange (3) of the supporting member (1), adjacent thereto.

An annular backing plate (12) is removably secured to the flange (4) of the supporting member (1) by tap screws (13) or the like, and extends from the rear axle housing (6) to adjacent the outer rim of the drum (2), parallel to the flange (7) of the supporting member (1). The side walls of the drum (2) and the flanges (3) and (7) of the supporting member form an annular channel in which the brake-shoes (8) are adapted to be mounted and which may be taken therefrom for relining or adjusting the same by removing the plate (12), thereby eliminating the necessity of removing the wheels of the vehicle.

In the present instance the braking mechanism is illustrated as associated with the transmission shaft of a vehicle by being attached to the rear axle housing, but it will be understood that it may be applied and used in connection with either the front or rear wheels of the vehicle.

Interposed between adjacent ends of the brake-shoes (8) are transversely disposed retaining pins (14) which are affixed at one end to the flange (7) of the supporting member (1) and extend through close fitting apertures provided in the removable plate (12). The pins (14) provide means for retaining the brake-shoes (8) in spaced relation to each other and are adapted to frictionally contact with the wearing plates (15) provided on the opposing ends of the brake-shoes.

The brake-shoes (8) are normally retained in an inoperative position by means of a pair of retractile springs (16) which are looped around the drum (2), one on each side of the flanges (11) of the shoes and bent to engage the pins (14) and the inner wall of the webs (10) of the shoes where they are secured in place by any suitable means such as by clamps (17) or the like.

The fluid pressure applying means of the dual system for actuating the brake-shoes (8) comprises radially extending cylinders (18) which are disposed centrally of each brake-shoe and secured to bushings (19), screw-threadably mounted in openings (20), provided in the flange (3) of the supporting member (1) and secured thereto by lock nuts or the like. The cylinders (18) are connected in circuit with a conventional source of fluid supply A, including a valve B, operated by the foot pedal C of the vehicle, by means of conduits (21) arranged around the inner surface of the flange (3) of the supporting member (1) and by a conduit (22) leading to the source of fluid supply. Within each of the cylinders (18) is a piston (23) which extends through the bushings (19) and contacts with the enlarged inner arcuate surface of the flange (11) of the brake-shoes.

The mechanical means for actuating the brake-shoes comprises rocker arms (24) in the form of bell-crank levers which are pivoted at (25) to the flange (4) of the supporting member (1). One end of the rocker-arms (24) is pivoted at (26) to links (27) which are in turn pivoted at (28) to a slip ring (29). The other or free ends of the rocker-arms (24) are adapted to work in guide slots (30) provided in the flange (3) of the supporting member (1) and are adapted to abut against operating pressure plates (31), as at (32). The pressure plates (31) are interposed between the shoes (8) and the supporting member (1) and are fitted around the outer end of the bushings (19) and the pistons (23) of the fluid cylinders (18) with their inner surface engaging the flange (3) of the supporting member and their outer surface abutting against the enlarged arcuate inner surface of the flange (11) of the brake-shoes (8). The slip ring (29) is rotatably mounted on a flange (33) which is secured to the flange (4) of the supporting member by bolts (34) or the like. In order to hold and guide the slip ring (29) in position on the flange (33), lugs (35) are provided at suitable spaced intervals around the flange. The slip ring (29) is pivoted at (36) to a link (37) which in turn is pivotally connected at (38) to one end of an arm (39). The arm (39) at its other end is mounted on one end of a rock shaft (40) which is journalled through the flange (4) of the supporting member and provided with a crank (41) which is to be connected to a suitable operating mechanism terminating in a brake operating device such as the emergency lever or an auxiliary foot pedal (not shown).

To actuate the brake-shoes (8) by the fluid pressure applying means, the foot pedal C of the vehicle is pressed by the foot of the operator when he desires to check or stop the vehicle thereby operating the valve B, which regulates the pressure of the fluid from the fluid source A. This movement of the valve causes the fluid from the source of supply A to enter the cylinders (18) through the conduits (21) and (22), and force the pistons (23) outwardly against the brake-shoes (8). Pressure is thus exerted on all of the pistons (23) to cause them to press outwardly on the brake-shoes, to force the brake-shoes against the drum (2), whereby the revolving of the wheel of which the drum forms a part will be checked or stopped depending upon the pressure exerted by the pistons (23) on the brake-shoes.

To release the brakes, the foot-pedal C is relieved of pressure by the foot, thus opening the valve B. The retractile springs (16) exerting an inward pull on the brake-shoes will pull in the brake-shoes and their corresponding pistons, thus causing the fluid to return through the conduits (21) and (22) to the fluid supply A.

To operate the mechanical applying means in conjunction with or independently of the fluid pressure applying means: Assuming that the arm (39) has been operated by means of the emergency brake lever of the vehicle to which it is to be connected and has been rotated in a clockwise direction as indicated by the arrow, the link (37) pivoted thereto pulls on the slip ring (29) which is caused to rotate on the flange (33) in a counter-clockwise direction, as indicated by the arrow. Upon rotation of the slip ring (29) the links (27) pivoted thereto, pull on the rocker-arms (24) thus rotating the rocker-arms about their pivots (25) and causing the free ends thereof to move in the guide slots (30) and abut against the pressure plates (31) which in turn force the brake-shoes (8) into contact with the internal surface of the brake drum (2). By releasing the brake-lever the reverse action takes place, thus permitting the retractile springs (16) to return the shoes (8) and the pressure plates (31) to their inoperative position.

It will thus be seen that there is provided a dual mechanism for actuating expanding brakes including both fluid pressure and mechanical means which may be operated either in conjunction with or independently of each other and in which the brake-shoes may be removed from the brake drum for relining or adjusting the same without the necessity of removing the wheels from the vehicle.

Although in the foregoing certain elements have been described as best adapted to perform the functions alotted to them, nevertheless it is to be understood that various minor changes such as causing the pistons of the fluid cylinders of the fluid pressure means to engage the ends of the brake-shoes instead of the center thereof as illustrated, may be resorted to without sacrificing any of the principles of the invention.

Having described my invention, what I claim as new and wish to secure by Letters Patent is:

1. In an internal expanding brake, a supporting member, a brake drum, a plurality of arcuate shoes for engagement with said drum, pressure plates engaging the arcuate inner surface of said shoes, fluid pressure means mounted on said supporting member and adapted to actuate said shoes directly and mechanical means for actuating said shoes indirectly through said pressure plates, said mechanical means comprising common control means, separate means connected to said common control means for moving each of said pressure plates against said brake shoes and means connected to said common control means and operable from a point outside the drum to operate said common control and separate means for expanding said shoes indirectly through said pressure plates independently of the fluid pressure means.

2. In an internal expanding brake, a supporting member, a brake drum, a plurality of arcuate shoes for engagement with said drum, pressure plates engaging the arcuate inner surface of said shoes, fluid pressure means mounted on said supporting member and adapted to actuate said shoes directly and mechanical means for actuating said shoes indirectly through said pressure plates, said mechanical means comprising a flange secured to said supporting member, a slip ring rotatably mounted on said flange, a plurality of rocker arms pivotally connected to said supporting member, one of each of said rocker arms adapted to move one of each of said pressure plates into contacting engagement with said shoes, links connecting each of said rocker-arms to said slip ring and means connected to said slip ring and operable from a point outside the drum to rotate said slip ring upon said flange to actuate said rocker arms into engagement with said pressure plates.

3. In an internal expanding brake, a supporting number, a brake drum, a plurality of arcuate shoes for engagement with said drum, pressure plates engaging the arcuate inner surface of said shoes, fluid pressure means mounted on said supporting member and adapted to actuate said shoes directly and mechanical means for actuating said shoes indirectly through said pressure plates, said mechanical means comprising a flange secured to said supporting member, a slip ring rotatably mounted on said flange, a plurality of rocker arms pivotally connected to said supporting member, one of each of said rocker arms adapted to move one of each of said pressure plates into contacting engagement with said shoes, links connecting each of said rocker arms to said slip ring, means connected to said slip ring and operable from a point outside the drum to rotate said slip ring upon said flange to actuate said rocker arms into engagement with said pressure plates and means to retract said brake shoes.

4. In an internal expanding brake, a supporting member, a brake drum, a plurality of arcuate shoes for engagement with said drum, pressure plates engaging the arcuate inner surface of said shoes, and two independently operable applying means for actuating said shoes, one of said means comprising a source of fluid supply, a plurality of cylinders in communication with said source of fluid supply and mounted on said supporting member, a piston provided in each of said cylinders and adapted to engage one of each of said shoes directly and the other of said means engaging said shoes indirectly through said pressure plates.

5. In an internal expanding brake, a supporting member, a brake drum, a plurality of arcuate shoes for engagement with said drum, pressure plates engaging the arcuate inner surface of said shoes and two independently operable applying means for actuating said shoes, one of said means comprising a source of fluid supply, a plurality of cylinders in communication with said source of fluid supply and mounted on said supporting member, a piston provided in each of said cylinders and adapted to engage one of each of said shoes directly and the other of said means engaging said shoes indirectly through said pressure plates, said pressure plates fitted around the shoe engaging portion of said pistons.

6. In an internal expanding brake, a supporting member, a brake drum, a plurality of arcuate shoes for engagement with said drum, pressure plates engaging the arcuate inner surface of said shoes and two independently operable applying means for actuating said shoes, one of said means comprising a source of fluid supply, a plurality of cylinders in communication with said source of supply and mounted on said supporting member, a piston in each of said cylinders and adapted to engage the arcuate inner surface of said shoes directly and the other of said means operating said shoes indirectly through said pressure plate and means to retract said shoes.

7. In an internal expanding brake, a supporting member, a brake drum, a removable plate secured to said supporting member and closing an open end of said drum, a plurality of spaced pins secured to said supporting member, a plurality of arcuate shoes mounted within said drum, for engagement with the inner surface thereof, the opposing ends of said shoes adapted to frictionally engage one of each of said pins, retracting springs having portions adapted to engage said pins and shoes, pressure plates engaging the arcuate inner surface of said shoes and mechanical means for moving said shoes into engagement with said drum indirectly through said pressure plates, said means comprising a flange secured to said supporting member, a slip ring rotatably mounted on said flange, a plurality of rocker arms pivotally connected to said supporting member, one of each of said rocker arms adapted to move one of each of said pressure plates into contacting engagement with said shoes, links connecting each of said rocker arms to said slip ring and means connected to said slip ring and operable from a point outside the drum to rotate said slip ring on said flange to actuate said rocker arms into engagement with said pressure plates.

KARL O. BOTNEN.